Figure 1:
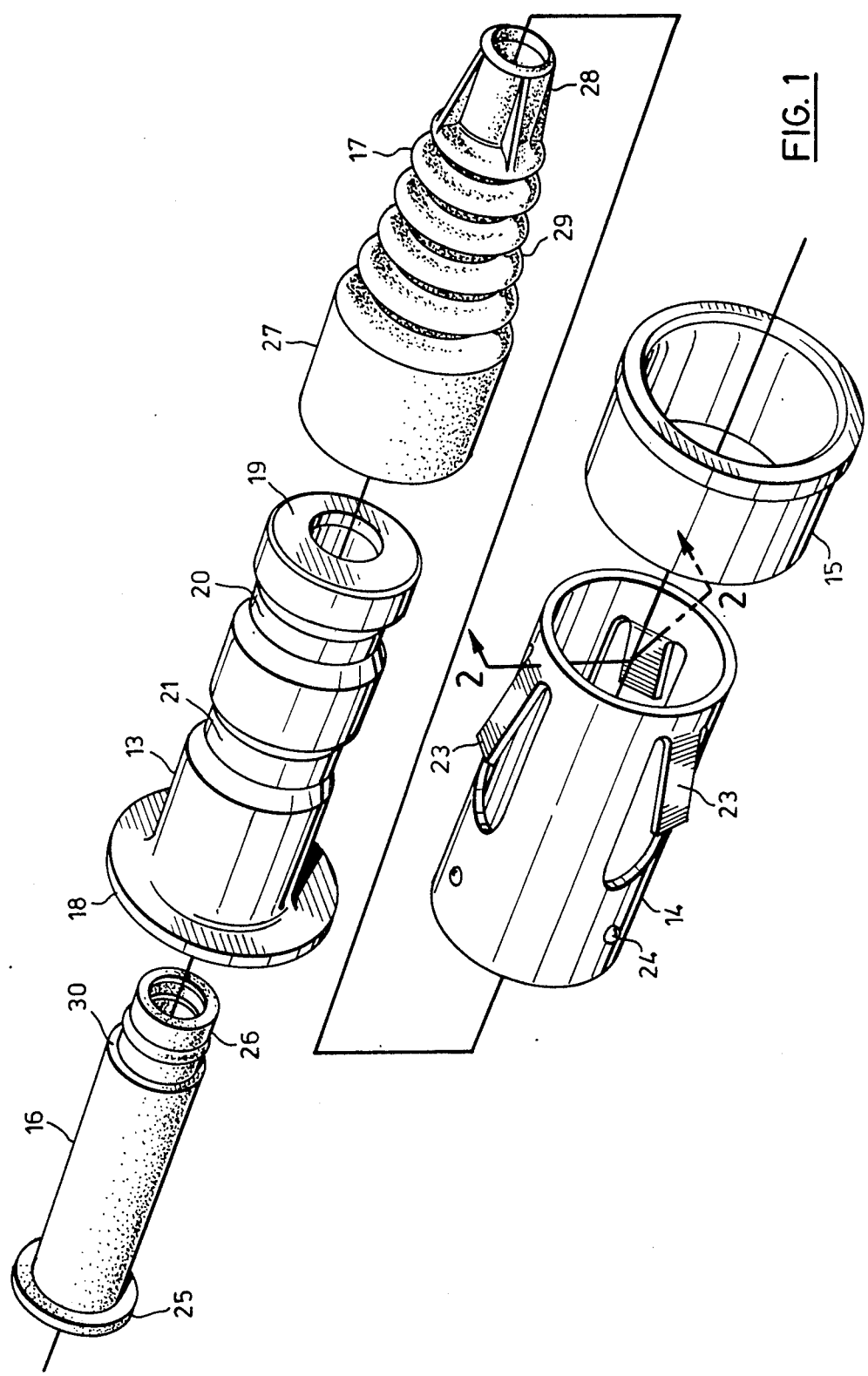

United States Patent [19]

Maccuaig

[11] Patent Number: 4,621,937
[45] Date of Patent: Nov. 11, 1986

[54] SELF-RETAINING ANCHORING ASSEMBLY AND SEAL THEREFOR

[76] Inventor: Stuart J. Maccuaig, 117 St. Vincent Street South, Stratford, Ontario, Canada, N5A 2W9

[21] Appl. No.: 830,352

[22] Filed: Feb. 18, 1986

[51] Int. Cl.[4] ............................................. F16D 9/00
[52] U.S. Cl. .................................. 403/197; 403/288; 74/501 R; 285/162
[58] Field of Search ............... 285/162; 403/197, 238, 403/239, 288; 74/501 R, 501 F; 174/65 R, 65 G; 16/2, 108

[56] References Cited

U.S. PATENT DOCUMENTS 4,131,379 12/1978 Gordy et al. ........................ 403/197
4,145,566 3/1979 Weingartner ..................... 174/65 R

*Primary Examiner*—Andrew V. Kundrat
*Attorney, Agent, or Firm*—Ridout & Maybee

[57] ABSTRACT

The invention provides a sealing arrangement for use with a self-retaining anchoring assembly whereby a coaxial cable is mounted within a throughbore in a support member. The sealing arrangement includes an elongate annular seal of flexible resilient material having a first cylindrical end portion which is sealingly fastened to the anchoring assembly, a second cylindrical end portion providing internal wiper means for sealing engagement with the inner cable member, and an intermediate portion tapering from the first to the second cylindrical portion and formed with annular corrugations imparting flexibility to the seal in all directions transverse to its axis.

7 Claims, 2 Drawing Figures

SELF-RETAINING ANCHORING ASSEMBLY AND SEAL THEREFOR

This invention relates to a self-retaining assembly for mounting a coaxial cable, such as a brake cable for example, within a throughbore defined in a support member, and is primarily concerned with an improved flexible sealing arrangement to be used in such an assembly.

Self-retaining anchoring assemblies, or conduit fittings, of this type are discussed, for example, in U.S. Pat. No. 4,131,379, issued Dec. 26, 1978 to Gordy et al and assigned to Orscheln Lever Sales Co. The conduit fitting of such an assembly typically comprises inner and outer concentrically arranged sleeve members providing cooperating abutment means at one end, and an annular collar mounted concentrically on the outer sleeve member adjacent said one end; the outer sleeve member provides a plurality of integral, circumferentially spaced resilient external prongs extending towards said one end of the device, the ends of the prongs being spaced from the mere end of the annular collar by a distance equal to the thickness of the support member whereby to retain the fitting in the throughbore with the annular collar and the ends of the prongs respectively engaging opposite faces of the support member. A resilient annular inner seal member engageable with the inner cable member may be concentrically arranged within the inner sleeve member. A resilient annular outer seal member, or flexible seal, may be mounted concentrically on the conduit fitting so as to extend from the other end thereof, the flexible seal having an annular sealing portion dimensioned so as to maintain a tight seal on the inner cable member to prevent foreign material from entering into the conduit.

In sealed strand and conduit applications, as in the case of a coaxial cable anchored in a throughbore of a support member, the inner cable member or strand extends into an open environment. The seal must be effective to prevent foreign material from entering the conduit from the open environment, and so must maintain its shape concentrically around the inner cable member. This requirement does not present a problem so long as the inner cable member is pulled linearly in the direction of its length. However, a problem arises when the inner cable member is repeatedly pulled out of alignment with the seal and the fitting, since the sealing portion or nose of the seal tends to be deformed permanently into a bell shape, thereby allowing ingress of foreign material into the conduit. The result is clogging or corrosion, resulting in premature cable failure.

The present invention provides, in or for a self-retaining anchoring assembly of the type referred to above, an improved sealing arrangement or flexible seal which will obviate this problem.

Accordingly, the invention provides, in or for a self-retaining anchoring assembly of the type referred to, a sealing arrangement comprising an elongate annular sealing member including a first annular end portion adapted for fastening engagement with the anchoring assembly, a second annular end portion providing internal sealing means positioned to engage the inner cable member in wiping relation thereto, and an intermediate portion extending from the first annular end portion to the second annular end portion and formed with integral annular corrugations. The corrugations impart flexibility to the seal in all directions transverse to its axis, while maintaining tight sealing engagement with the inner cable member. Furthermore, by virtue of the tapered configuration of the intermediate portion, the sealing member remains rigid enough to prevent or minimize any bellows effect due to cable movements, the effect of which would be to pump air and lubricant out of the system and to draw foreign material into the system.

Figure 2:
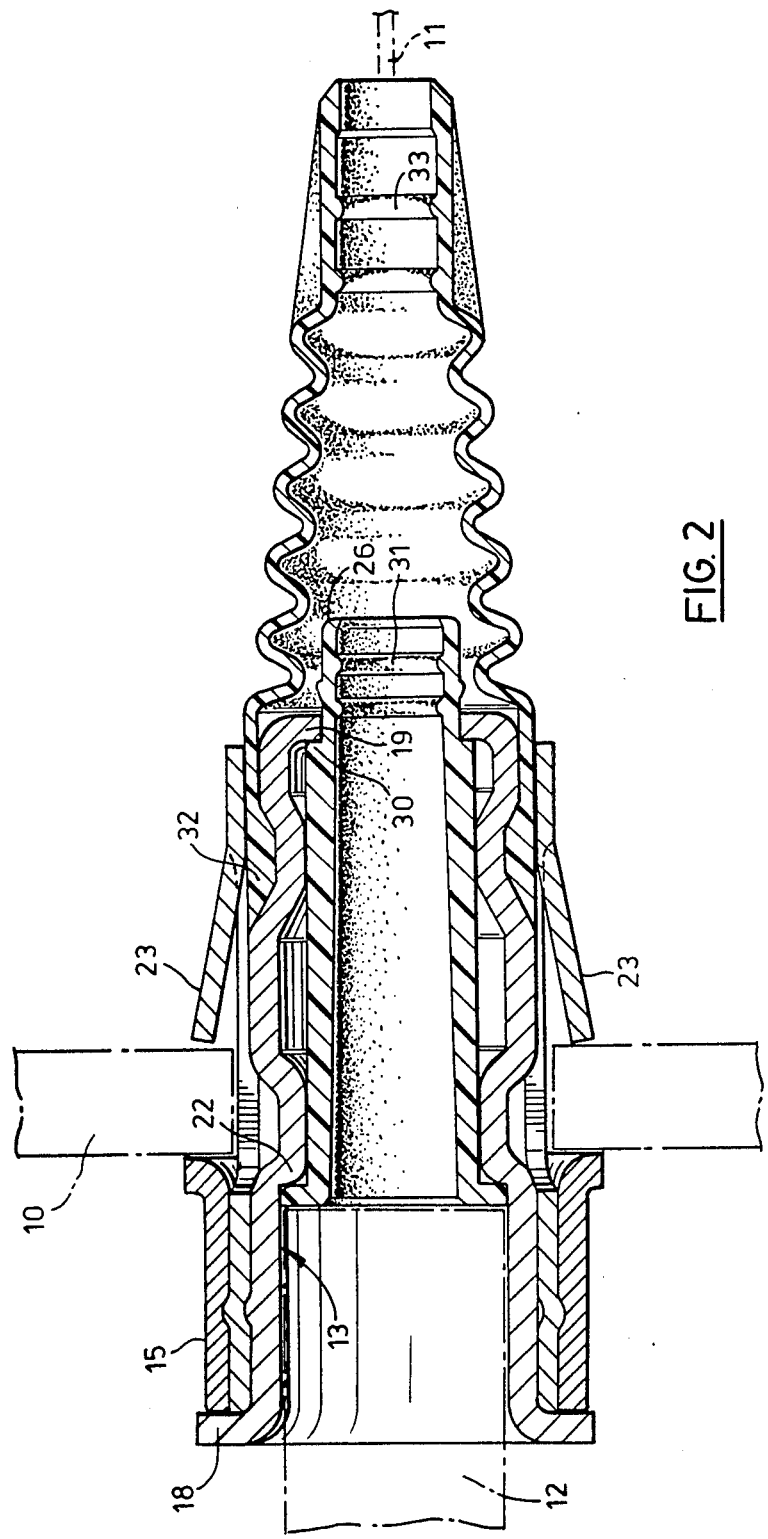

One self-retaining anchoring assembly with sealing arrangement in accordance with the present invention will now be described by way of example with reference to the accompanying drawings, in which:

FIG. 1 is an exploded perspective view of the assembly showing its component parts: and FIG. 2 is a longitudinal sectional view of the assembly, taken on line 2—2 in FIG. 1.

As shown in FIG. 2 of the drawings, the anchoring assembly is adapted to mount a coaxial cable within a throughbore defined in a support member 10. In the present example the cable is a brake cable of conventional construction including concentrically arranged inner and outer cable members 11, 12.

As shown in FIG. 1, the anchoring assembly consists of the following components arranged concentrically with one another: an inner sleeve member 13, an outer sleeve member 14, an annular collar 15, an inner seal member 16 and an outer seal member or flexible seal 17. The inner sleeve member 13 is a rolled eyelet sleeve having a radially outwardly extending flange 18 at one end and a radially inwardly directed flange 19 at its other end. The sleeve is formed with an annular recess 20 adjacent the latter end and is also formed with an annular recess 21 which provides an internal annular abutment 22 (FIG. 2). The outer sleeve member 14 is generally cylindrical in shape and is formed with a plurality of integral, circumferentially spaced, resilient external prongs 23 extending towards one end of the sleeve member 14, and a plurality of integral, circumferentially spaced external protuberances 24 are stamped out of the sleeve member adjacent its said one end. The annular collar 15 is a rigid cylinder of such diameter that it can be slid over the outer sleeve member past the prongs 23 and frictionally held in place at a said one end of the outer sleeve member 14 by the protuberances 24. The inner seal member 16 is a cylindrical body of flexible resilient material having a radially outwardly directed flange 25 at one end and a sealing portion 26 at its other end, which sealing portion is dimensioned to engage the inner cable member in wiping relation thereto.

The outer seal member or flexible seal 17 is also an elongate body of resilient flexible material, such as rubber, an elastomer, or other synthetic plastic material. The flexible seal 17 provides a first annular end portion 27 which is generally cylindrical in shape, and a second annular end portion 28 which is generally cylindrical in shape. The flexible seal further comprises a generally conical intermediate portion 29 which extends from the end portion 27 to the end portion 28. This intermediate portion 29, which in the present example tapers throughout its length from the end portion 29 to the end portion 28, is formed with integral annular corrugations whereby to provide flexibility of the flexible seal in all directions transverse to its axis.

The manner in which these components are assembled to form the complete anchoring assembly with inner and outer seals is shown in FIG. 2. The cable extends from the left hand side of the support member 10 where the inner cable member 11 is protected by the conduit 12 into an open environment on the other side of the support member where the inner cable member 11 is exposed to foreign material. The inner sleeve member 13 extends through the borehole from the left hand side of the support member 10, the inner seal member 16 being located within the inner sleeve member 13, being positioned by its flange 25 which abuts against the abutment 22 and by a shoulder 30 which abuts against the inturned flange 19 of the inner sleeve. The sealing portion 26 is formed with internal annular ribs 31 which sealing engage the inner cable member. The outer sleeve member 14 is mounted concentrically over the inner sleeve member 13 with its end abutting against the abutment flange 18 of the inner sleeve member and with the free ends of the resilient prongs 23 bearing against one face of the support member 10. The assembly is secured by the annular collar 15 which is frictionally held in place by the protuberances 14 with one end extending to the abutment flange 18 of the inner sleeve member and the other end abutting against the opposite face of the support member 10. Thus, in the assembly, the tips of the prongs 23 are spaced from the collar 15 by a distance equal to the thickness of the support member 10.

The first annular end portion 27 of the flexible seal 17 is clamped between the inner and outer sleeve members as illustrated in FIG. 2. The end portion 27 is formed with an internal retaining rib 32, the retaining rib cooperating with the annular recess 20 in which it engages.

Since the corrugated intermediate portion of the flexible seal 17 imparts flexibility in all directions transverse to its axis, the flexible seal can readily follow displacements of the inner cable member if the latter is pulled out of alignment with the axis of the anchoring assembly without affecting the quality of the seal provided by the end portion 28 and its internal sealing ribs 33. Furthermore, by reason of the tapered configuration of the flexible seal, the flexible seal has sufficient stiffness to avoid any bellows action which would arise without the tapering, and which would result in expulsion of air and lubricant from the sealing system on the one hand, and ingress of foreign material into the system on the other hand, due to back and forth cycling of the inner cable member.

What I claim is:

1. A self-retaining anchoring assembly for mounting a coaxial cable within a throughbore defined in a support member, the coaxial cable including concentrically arranged inner and outer cable members, comprising:
   inner and outer concentrically arranged sleeve members providing cooperating abutment means at one end, and an annular collar mounted concentrically about the outer sleeve member adjacent said one end in fixed relation thereto, the outer sleeve member providing a plurality of integral, circumferentially spaced resilient external prongs extending towards said one end and spaced from the annular collar by a distance equal to the thickness of the support member whereby to retain the assembly in the throughbore with the annular collar and the ends of the prongs engaging respectively opposite faces of the support member, and
   a first annular seal of resilient flexible material arranged concentrically with the sleeve members and extending from the other end thereof, said first annular seal providing a first annular end portion clamped between said inner and outer sleeve members, a second annular end portion providing internal sealing means positioned to engage the inner cable member in wiping relation thereto, and an intermediate portion extending from the first annular portion to the second annular portion and formed with integral annular corrugations.

2. A self-retaining anchoring assembly according to claim 1, wherein said first annular end portion of the first annular seal is cylindrical and formed with an internal retaining rib, the retaining rib engaging in a cooperating annular recess of the inner sleeve against which the first end portion is clamped by the outer sleeve.

3. A self-retaining anchoring assembly according to claim 2, wherein said second annular end portion of the first seal is cylindrical and formed with a plurality of axially spaced annular rigs dimensioned to engage the inner cable member in wiping relation therewith.

4. A self-retaining anchoring assembly according to claim 1, further comprising a second annular seal located within the inner sleeve, the second annular seal and the inner sleeve being formed formed with respective interengaging annular abutments restraining axial displacement of said second annular seal, and said second annular seal providing a cylindrical throughbore for receiving the inner cable member and internal annular ribs dimensioned to engage the inner cable in wiping relation therewith.

5. A self-retaining anchoring assembly according to claim 1, wherein the outer sleeve has a cylindrical portion adjacent said one end, which cylindrical portion has a radial projection engagable with the annular collar for frictionally retaining the sleeve and collar in fixed axial relationship.

6. A self-retaining anchoring assembly according to claim 1, wherein said intermediate portion tapers in the direction of its length from the first annular portion to the second.

7. A sealing arrangement for use with a self-retaining anchoring device for mounting a coaxial cable within a throughbore in a support member, the cable including concentrically arranged inner and outer cable members, an elongate annular seal of flexible resilient material, the seal comprising a first cylindrical end portion adapted for fastening engagement with the anchoring device, a second cylindrical end portion providing internal wiper means for wiping engagement with the inner cable member, and an intermediate portion tapering from said first cylindrical portion to said second cylindrical portion and formed with annular corrugations imparting flexibility to the seal in all directions transverse to its axis.

* * * * *